(12) United States Patent
Khang et al.

(10) Patent No.: US 7,592,618 B2
(45) Date of Patent: Sep. 22, 2009

(54) NANOPARTICLE ELECTROLUMINESCENCE AND METHOD OF MANUFACTURING THE SAME

(75) Inventors: Yoon-ho Khang, Yongin-si (KR); Eun-hyu Lee, Seoul (KR); Kyo-yeol Lee, Yongin-si (KR); Joo-hyun Lee, Seoul (KR); Seong-il Im, Seoul (KR)

(73) Assignee: Samsung Electronics Co., Ltd. (KR)

( * ) Notice: Subject to any disclaimer, the term of this patent is extended or adjusted under 35 U.S.C. 154(b) by 427 days.

(21) Appl. No.: 11/356,122

(22) Filed: Feb. 17, 2006

(65) Prior Publication Data

US 2006/0188707 A1     Aug. 24, 2006

(30) Foreign Application Priority Data

Feb. 24, 2005    (KR) .................. 10-2005-0015574

(51) Int. Cl.
*H01L 33/00*    (2006.01)
(52) U.S. Cl. .............. 257/13; 257/103; 257/E33.035; 977/950; 977/952
(58) Field of Classification Search ............ 257/13
See application file for complete search history.

(56) References Cited

U.S. PATENT DOCUMENTS

| 7,301,172 | B2 * | 11/2007 | Atwater et al. ............ 257/79 |
| 2003/0230629 | A1 * | 12/2003 | Bourianoff et al. ......... 235/454 |
| 2004/0252488 | A1 * | 12/2004 | Thurk ....................... 362/147 |

FOREIGN PATENT DOCUMENTS

JP    9-181353    7/1997

* cited by examiner

*Primary Examiner*—Jerome Jackson, Jr.
(74) *Attorney, Agent, or Firm*—Cantor Colburn LLP

(57) ABSTRACT

The nanoparticle electroluminescence device includes: a front electrode formed of a transparent conductive material; a rear electrode formed of a conductive material; and an emitting layer interposed between the front electrode and the rear electrode and comprising a plurality of nanoparticles having a core/shell structure comprising a core formed of silicon and a shell formed of silicon oxide or silicon nitride on the surface of the core.

10 Claims, 4 Drawing Sheets

LIGHT

NANOPARTICLE ELECTROLUMINESCENCE AND METHOD OF MANUFACTURING THE SAME

CROSS-REFERENCE TO RELATED PATENT APPLICATIONS

Priority is claimed to Korean Patent Application No. 10-2005-0015574, filed on Feb. 24, 2005, in the Korean Intellectual Property Office, the disclosure of which incorporated herein in its entirety by reference.

BACKGROUND OF THE INVENTION

1. Field of the Disclosure The present disclosure relates to an electroluminescence device and a method of manufacturing the same, and more particularly, to a nanoparticle electroluminescence device having excellent light emission and an improved luminescence efficiency, and a method of manufacturing the same.

2. Description of the Related Art

Electroluminescence (EL) devices are devices which emit light by electrical excitation. For example, when electric energy is supplied to electrons in a low energy level and the electrons move to a higher energy level when the electric energy is cut off, the electrons return to the low energy level and light of predetermined wavelength may be generated. Organic EL devices are examples of EL devices and have a basic structure in which a thin organic emitting layer having a thickness of about 100-200 nm is interposed between an anode formed of indium tin oxide (ITO) as a transparent electrode, and a cathode such as a metal having a small work function, for example, Ca, Li, Al/Li, Mg/Ag, etc. In these organic EL devices, electroluminescence is produced by recombination of electrons and holes injected from both electrodes.

In the prior art, research for using luminescence particles, that is, nanoluminescence particles of nanometer dimensions as material for emitting layers, for these EL devices has been performed. Nanoparticles have an uncontinuous energy level, unlike bulk particles. Nanoparticles have different physical, chemical and photoelectron properties from those of bulk particles. In particular, it is known that nanoparticles can be used to form a material for an emitting layer (EML), because light having a variety of wavelengths, that is, light from a total visible area and a blue color to an ultraviolet-ray area can be easily produced due to an increase in an energy bandgap and a quantization effect as the size of the nanoparticles decreases.

It is known that if the size of fine silicon (Si) is of nanometer dimensions, luminescence in a visible light area can be obtained at room temperature. For example, luminescence from violet light in a blue color area can be observed from a thin film formed of Si nanoparticles having an average diameter of 3 nm. The result, which suggests direct transition in an Si crystal caused by a quantization size effect is known about. However, research for Si fine particles is still at an experimental stage, and development of an emitting layer (EML) material having a stronger luminescence strength that generates light having a short luminescence wavelength is further required so as to implement a device having new functions.

Japanese Patent No. 1997-181353 discloses a method of manufacturing Si fine particles and a luminescence device using an Si fine particle thin film. Here, the Si fine particles are manufactured by cooling Si in a vapor state using a solvent, and the luminescence device includes a thin film on which the Si fine particles are stacked. However, defects such as dangling bonds or vacancy etc. may exist on the surface of the Si fine particles. These defects may badly affect luminescence efficiency and luminescence characteristics of Si fine particles.

SUMMARY OF THE DISCLOSURE

The present disclosure provides a nanoparticle electroluminescence device having excellent light emission and an improved luminescence efficiency, and a method of manufacturing the same.

According to an aspect of the present disclosure, there is provided a nanoparticle electroluminescence device including: a front electrode formed of a transparent conductive material; a rear electrode formed of a conductive material; and an emitting layer interposed between the front electrode and the rear electrode and comprising a plurality of nanoparticles having a core/shell structure comprising a core formed of silicon and a shell formed of silicon oxide or silicon nitride on the surface of the core.

According to another aspect of the present disclosure, there is provided a method of manufacturing a nanoparticle electroluminescence device, the method including: preparing a transparent substrate; forming a front electrode on the substrate using a transparent conductive material; forming an emitting layer comprising a plurality of nanoparticles comprising a core/shell structure having a core formed of silicon and a shell formed of silicon oxide or silicon nitride on the surface of the core, on the front electrode; and forming a rear electrode on the emitting layer using a conductive material.

According to the present disclosure having the above structure, the nanoparticle electroluminescence device having excellent light emission and an improved luminescence efficiency can be obtained.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Figure 1:
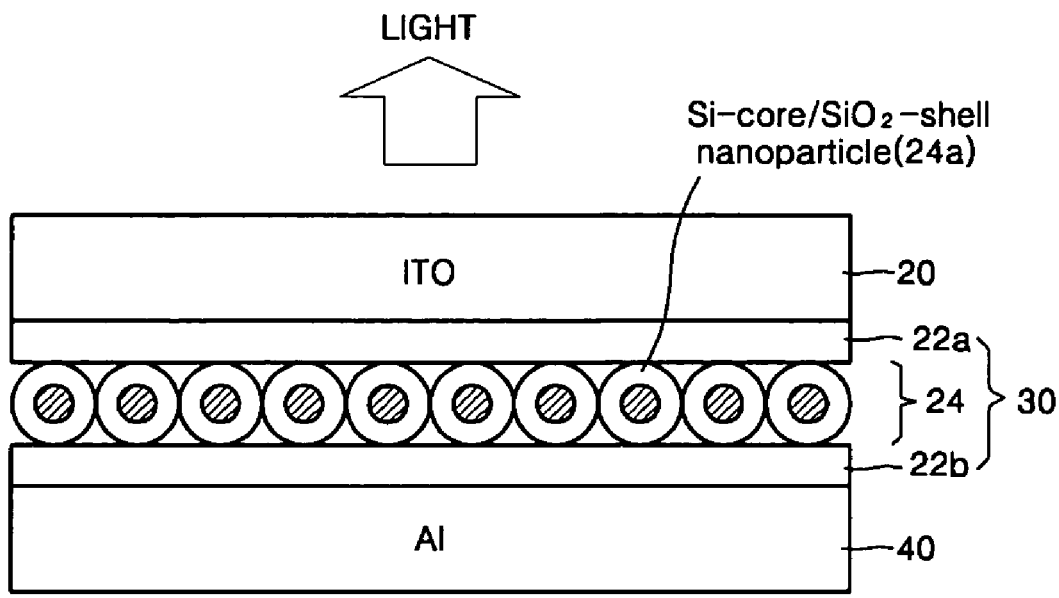
FIG. 1 is a schematic cross-sectional view of a nanoparticle eletroluminescence device according to an embodiment of the present invention.

Hereinafter, the present invention will be described in detail by explaining exemplary embodiments of the invention with reference to the attached drawings. In the drawings, the thicknesses of layers and regions are exaggerated for clarity.

FIG. 1 is a schematic cross-sectional view of a nanoparticle eletroluminescence device according to an embodiment of the present invention. Referring to FIG. 1, the nanoparticle electroluminescence device according to the present disclosure includes a front electrode 20, a rear electrode 40, and an emitting layer (EML) 30 interposed between the front electrode 20 and the rear electrode 40.

The emitting layer (EML) 30 is an area in which recombination of electrons and holes supplied from both electrodes 20 and 40 is performed and luminescence is produced. Here, the EML 30 includes nanoparticles 24a having a core/shell structure comprising a core formed of silicon and a shell formed of silicon oxide ($SiO_2$) or silicon nitride ($Si_3N_4$), for example, on the surface of the core. Here, the nanoparticles 24a having the core/shell structure may be manufactured using pyrolysis or laser ablation. A method of generating particles using pyrolysis or laser ablation is generally widely known, and thus, a detailed description thereof will be omitted. When generating the nanoparticles 24a, the manufactured Si-core is thermally processed at a predetermined temperature in an oxygen ($O_2$) or ammonia ($NH_3$) atmosphere so that the nanoparticles 24a having the core/shell structure in which a shell of silicon oxide or silicon nitride is formed on the surface of the core can be obtained. Accordingly, the structure of the nanoparticles 24a having the core/shell structure is such that, the Si-core is effectively capped by the shell so that the interface characteristics and luminescence characteristics of the Si-core can be improved. In particular, since a formation of defects such as dangling bonds or vacancy etc. on the surface of the Si-core is prevented by the shell, the surface of the Si-core can be stabilized. The diameter of the nanoparticles 24a is between 1 nm and 10 nm.

The EML 30 may include a nanoparticle layer 24 formed of nanoparticles 24a having the core/shell structure and insulating layers 22a and 22b formed above and below the nanoparticles 24, respectively. Here, the insulating layers 22a and 22b can be formed of silicon oxide ($SiO_2$) or silicon nitride ($Si_3N_4$).

The front electrode 20 is formed of a transparent conductive material so that light emitted from the EML 30 can be transmitted. An example of a transparent conductive material is indium tin oxide (ITO). In addition, the rear electrode 40 is formed of a conductive material, for example, Al or Mg. In an electroluminescence (EL) device, the function and material of the front electrode 20 and the rear electrode 40 are generally widely known, and thus, a detailed description thereof will be omitted.

Figure 2:
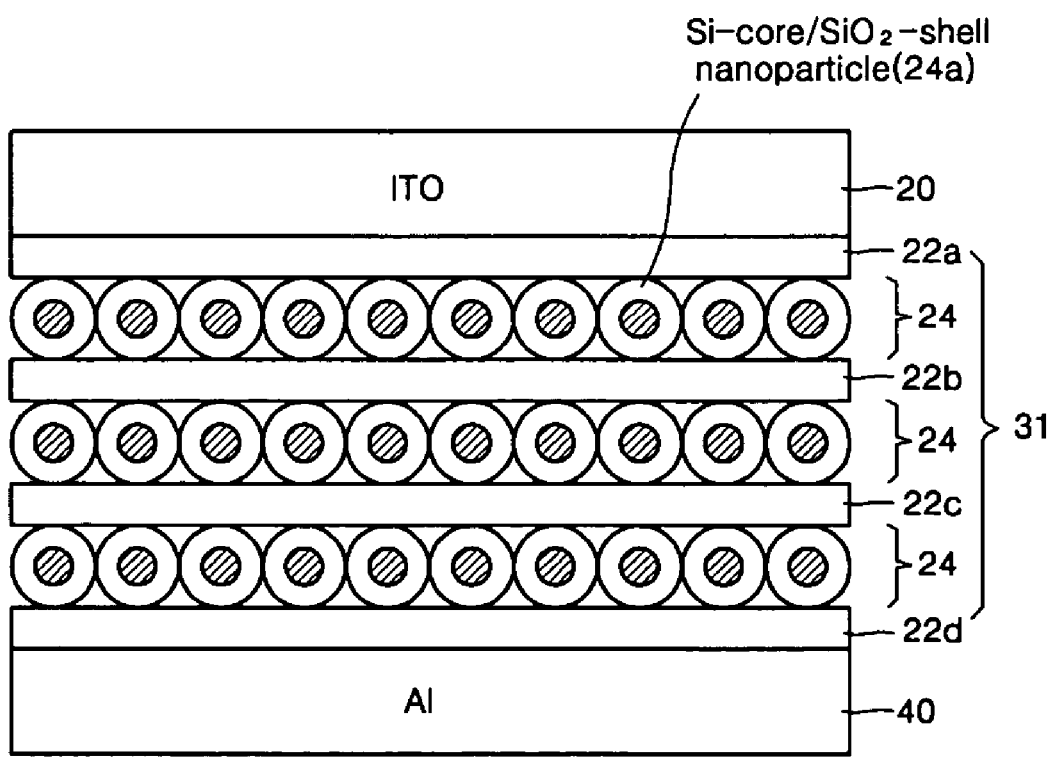
FIG. 2 is a schematic cross-sectional view of a nanoparticle electroluminescence device according to another embodiment of the present invention.

According to the present disclosure having the above structure, the interface characteristics of the Si-core are improved by effectively capping the core using the shell so that a nanoparticle electroluminescence device having excellent light emission and an improved luminescence efficiency can be obtained FIG. 2 is a schematic cross-sectional view of a nanoparticle electroluminescence device according to another embodiment of the present invention. Here, a description of similar elements as those shown in FIG. 1 will be omitted, and like elements denote like reference numerals.

In a nanoparticle electroluminescence device illustrated in FIG. 2, an EML 31 interposed between the front electrode 20 and the rear electrode 40 includes at least one EML 30 that is the same as the EML 30 illustrated in FIG. 1. Specifically, the EML 30 illustrated in FIG. 2 includes a plurality of nanoparticle layers 24 formed of nanoparticles 24a having the core/shell structure and insulating layers 22a, 22b, 22c, and 22d formed above and below the nanoparticle layers 24, respectively. A plurality of EMLs are formed in this way so that a nanoparticle electroluminescence device is formed having higher light emission than the light emission generated when a single EML is formed.

Figure 3A:
FIGS. 3A through 3F illustrate a method of manufacturing a nanoparticle electroluminescence device according to another embodiment of the present invention.
Figure 3B:
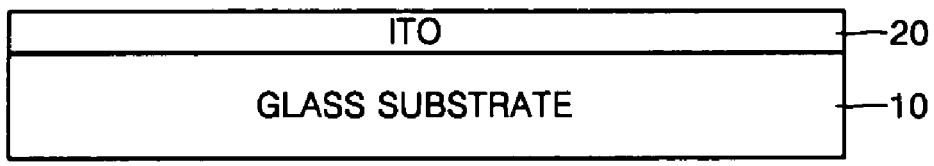
Figure 3C:
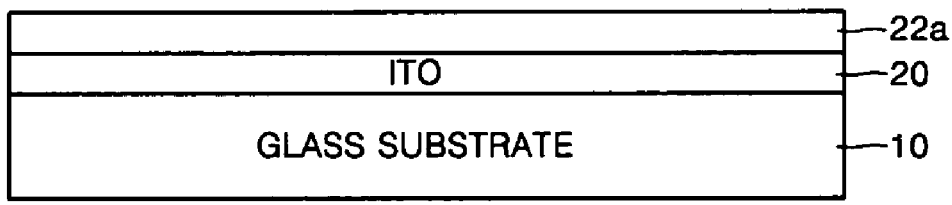

FIGS. 3A through 3F illustrate a method of manufacturing a nanoparticle electroluminescence device according to another embodiment of the present invention. Referring to FIGS. 3A through 3C, a transparent substrate 10 is prepared and a front electrode 20 is formed of a transparent conductive material, for example, ITO, on the substrate 10. Next, a lower insulating layer 22a is formed on the front electrode 20. The transparent substrate 10 can be formed of a material selected from the group consisting of plastic and sapphire etc. Here, the lower insulating layer 22a is generally formed of silicon oxide ($SiO_2$) or silicon nitride ($Si_3N_4$) but the present invention is not limited to these materials. The lower insulating layer 22a may be formed using a well-known thin film deposition method, for example, chemical vapor deposition (CVD) or physical vapor deposition (PVD).

Figure 3D:
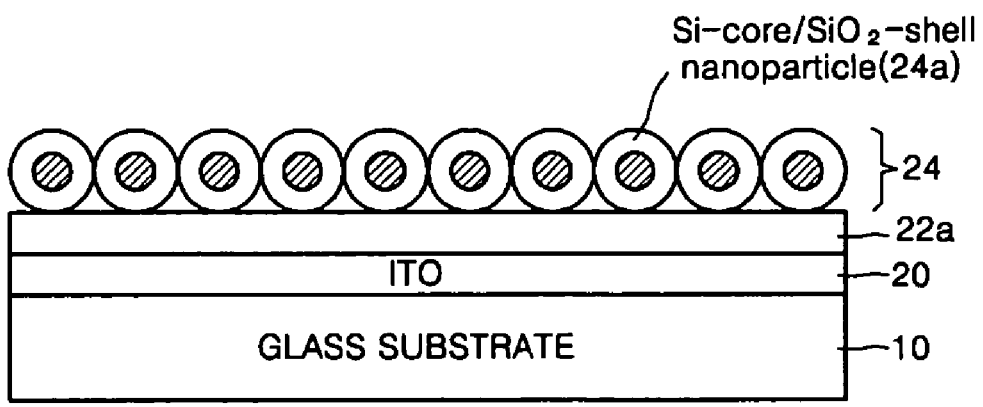

Referring to FIG. 3D, nanoparticles 24a having a core/shell structure comprising a core formed of silicon and a shell formed of silicon oxide ($SiO_2$) or silicon nitride ($Si_3N_4$), for example, on the surface of the core, are coated on the lower insulating layer 22a so that a nanoparticle layer 24 is formed. The diameter of the nanoparticles 24a is between 1 nm to 10 nm. Here, the nanoparticles 24a may be formed using pyrolysis or laser ablation. A method of generating particles using pyrolysis or laser ablation is generally widely known, and thus, a detailed description thereof will be omitted. When generating the nanoparticles 24a, the manufactured Si-core is thermally processed at a predetermined temperature in an oxygen ($O_2$) or ammonia ($NH_3$) atmosphere so that the nanoparticles 24a having the core/shell structure in which a shell of silicon oxide or silicon nitride is formed on the outer surface of the core can be obtained.

In addition, the nanoparticles 24a can be coated using the widely known processes of thermophoresis or electrophoresis, and thus, a detailed description thereof will be omitted.

Figure 3E:
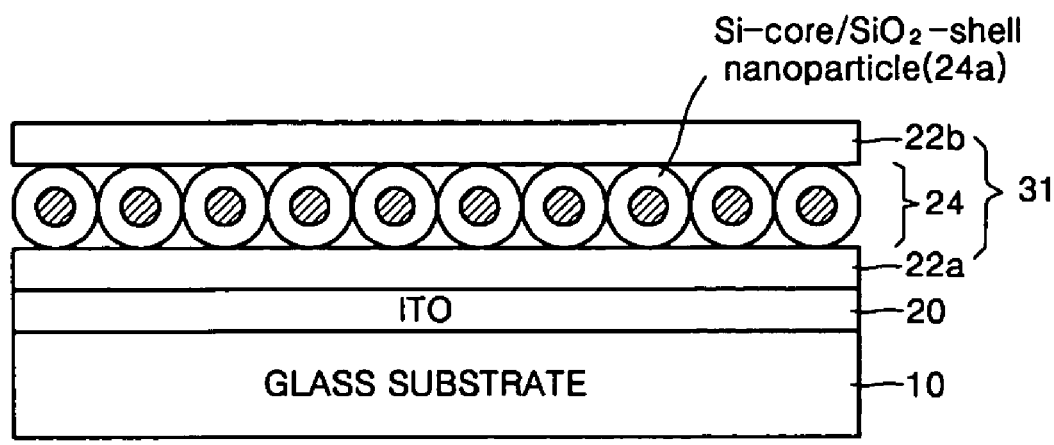
Figure 3F:
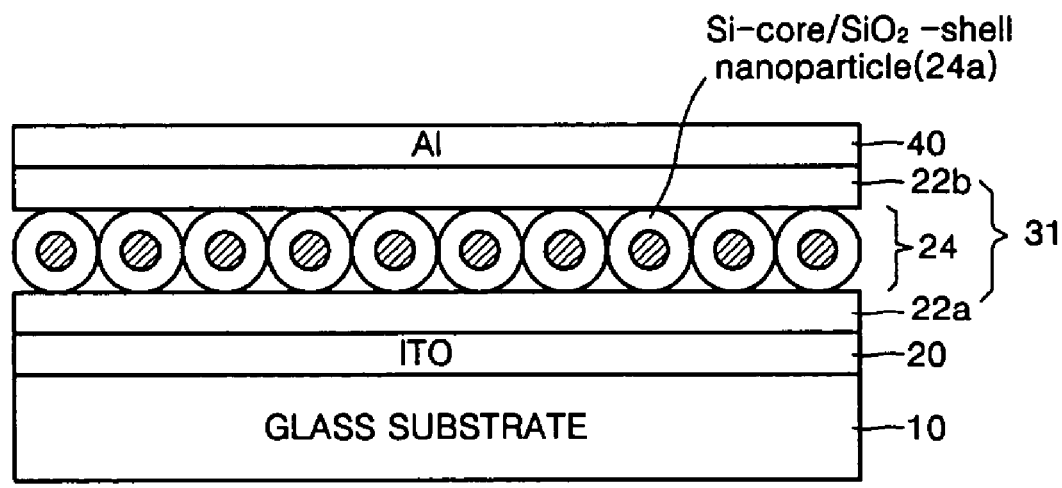
Figure 3F:
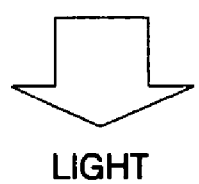

Referring to FIGS. 3E and 3F, an upper insulating layer 22b and a rear electrode 40 are sequentially stacked on the nanoparticle layer 24. The upper insulating layer 22b is generally formed of silicon oxide ($SiO_2$) or silicon nitride ($Si_3N_4$), for example, but the present invention is not limited to these materials and the upper insulating layer 22b may be formed of other insulating materials. The rear electrode 40 is formed of a conductive material, for example, Al or Mg. The upper insulating layer 22b and the rear electrode 40 may be formed using a well-known thin film deposition method, for example, CVD or PVD.

Using the above procedure, a nanoparticle electroluminescence device having excellent light emission and an improved luminance efficiency can be obtained. In particular, the size of the nanoparticles is controlled when manufacturing the nanoparticle electroluminescence device so that a quantum confinement effect can be obtained from the nanoparticles. The method of manufacturing the nanoparticle electroluminescence device having the above structure can be easily performed, and costs are low.

The lower insulating layer 22a, the nanoparticle layer 24, and the upper insulating layer 22b, which are sequentially stacked, may form one EML 30, and at least one emitting layers of the structure of the EML 30 may be further stacked on the EML 30. A plurality of EMLs are formed in this way so that a nanoparticle electroluminescence device is formed having higher light emission than the light emission generated when a single EML 30 is formed.

Figure 4:
FIG. 4 is a photo illustrating photoluminescence (PL) characteristics of Si-nanoparticles having a core/shell structure.

FIG. 4 is a photo showing luminescence characteristics of Si-nanoparticles having a core/shell structure.

According to the present disclosure having the above structure, the interface characteristics of the Si-core are improved by effectively capping the Si-core by the shell so that the nanoparticle electroluminescence device having excellent light emission and an improved luminescence efficiency can be obtained. In particular, the EML of the nanoparticle electroluminescence device according to the present disclosure includes nanoparticles having a core/shell structure so that the Si-core is effectively capped by the shell and the interface characteristics and luminescence characteristics of the Si-core can be improved.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A nanoparticle electroluminescence device comprising:
    a front electrode formed of a transparent conductive material;
    a rear electrode formed of a conductive material; and
    an emitting layer interposed between the front electrode and the rear electrode, wherein said emitting layers includes a plurality of nanoparticle layers, each nanoparticle layer includes a plurality of nanoparticles having a core/shell structure comprising a core formed of silicon and a shell formed of silicon oxide or silicon nitride on the surface of the core, and wherein said emitting layers further includes insulating layers formed above and below the plurality of nanoparticle layers, and an insulating layer between adjacent nanoparticle layers among said plurality of nanoparticle layers.

2. The device of claim 1, wherein insulating layers are formed of silicon oxide or silicon nitride.

3. The device of claim 1, wherein a diameter of the nanoparticles is between 1 nm and 10 nm.

4. A method of manufacturing a nanoparticle electroluminescence device, the method comprising:
    preparing a transparent substrate;
    forming a front electrode on the substrate using a transparent conductive material; and
    forming an emitting layer comprising a plurality of nanoparticle layers, each nanoparticle layer including a plurality of nanoparticles comprising a core/shell structure having a core formed of silicon and a shell formed of silicon oxide or silicon nitride on the surface of the core, and wherein said emitting layers includes insulating layers formed above and below the plurality of nanoparticle layers, and an insulating layer between adjacent nanoparticle layers among said plurality of nanoparticle layers on the front electrode; and forming a rear electrode on the emitting layer using a conductive material.

5. The method of claim 4, wherein the forming of the emitting layer comprises:
    forming a lower insulating layer on the front electrode;
    forming a nanoparticle layer by coating the nanoparticles on the lower insulating layer;
    forming an upper insulating layer on the nanoparticle layer;
    forming another nanoparticle layer on the upper insulating layer; and
    forming another upper insulating layer on said another nanoparticle layer.

6. The method of claim 5, wherein the insulating layers are formed of silicon oxide or silicon nitride.

7. The method of claim 5, wherein the forming of the nanoparticle layer comprises:
    preparing the nanoparticles; and
    coating the nanoparticles on the lower insulating layer.

8. The method of claim 7, wherein the preparing of the nanoparticles is performed using pyrolysis or laser ablation.

9. The method of claim 8, wherein a diameter of the nanoparticles is between 1 nm and 10 nm.

10. The method of claim 8, wherein the coating of the nanoparticles is performed using thermophoresis or electrophoresis.

* * * * *